Patented June 30, 1925.

1,544,422

UNITED STATES PATENT OFFICE.

FREDERICK M. BECKET, OF NEW YORK, N. Y., ASSIGNOR TO ELECTRO METALLURGICAL COMPANY, OF NEW YORK, N. Y., A CORPORATION OF WEST VIRGINIA.

WELDING ROD.

No Drawing. Application filed November 3, 1922. Serial No. 598,936.

*To all whom it may concern:*

Be it known that I, FREDERICK M. BECKET, a citizen of the United States, residing at New York, in the county of New York and State of New York, have invented certain new and useful Improvements in Welding Rods, of which the following is a specification.

This invention relates to welding rods adapted to be fused by the electric arc or before the blowpipe to supply fluid metal for welding, filling, sheathing or like operations. The invention comprises novel compositions for the constitution of such rods, as hereinafter more fully described.

The excellent properties of chromium-molybdenum steels have already been recognized. The desirability of welds in which the added metal possesses the characteristic properties of chromium-molybdenum steels was apparent, but so far as I am aware, welding with such compositions had not been successfully accomplished prior to my invention.

Failure to develop a chromium-molybdenum steel weld was probably due to one or more of the following considerations. The behavior of an alloy steel when used as the added metal in welding cannot be accurately predicted because of the oxidizing and other influences which act on the metal during its deposition in the weld. The possibility of welding with chromium-molybdenum steel of members of different composition, such as carbon steel, could not have been predicted because of the heterogeneity of the material of the joint which would result from such an operation. Special heat treatment is regarded as necessary to develop the desirable qualities of chromium-molybdenum steels, and the application of such treatment to welded members would be difficult in most cases and impossible in many.

I have discovered that by using a welding rod of suitable composition, a chromium-molybdenum steel weld may be produced which not only equals the usual requirements but exceeds them, possessing exceptional strength and ability to withstand shocks and alternating stresses.

To obtain satisfactory welds, not only must the chromium and molybdenum be present in the rod in proper proportions, but the carbon content must also be suitably adjusted, and one or more auxiliary agents adapted to protect the major constituents (chromium, molybdenum and carbon) from oxidation and to produce a slag suitable to prevent the absorption of gases by the molten metal, should preferably be provided.

The chromium, molybdenum, and carbon contents of the rod should be high enough to insure a sufficient proportion of these elements in the added metal after the quantities which are lost through oxidation during the welding operation are subtracted. Depending on the composition desired in the finished weld, the chromium may vary between 0.25% and 1.50%; the molybdenum between 0.10% and 0.75%; and the carbon between 0.10% and 0.50%. If the chromium and carbon are above the higher limits recited, the welding operation becomes difficult, and the weld tends to become brittle. The molybdenum may be increased above the limit given, but the quantity specified is sufficient, and it is desirable to keep down the molybdenum content on the ground of economy.

As a protection against oxidation and the dissolving of nitrogen in the added metal, an addition of silicon or manganese, or preferably both, is recommended. Manganese and silicon, when concurrently oxidizing in a welding operation, give a fluid slag which is highly efficacious in protecting the metal. I have used manganese contents between 0.25% and 1.25%, with silicon between 0.10% and 0.75%, but I believe that the ranges for these protective elements are even wider than those covered in my tests.

An excellent composition for general use is a steel containing: Cr, 0.75%; Mo, 0.20%; C, 0.20%; Mn, 1.00%, and Si, 0.50%, while in a specific instance where the desirability of higher contents of chromium and molybdenum was indicated, I have employed a rod containing: Cr, 1.35%; Mo, 0.70%; C, 0.30%; Mn, 0.90%, and Si, 0.35%.

In many cases welds produced with the compositions of my invention exhibit the properties of heat-treated chromium-molybdenum steel. This is especially true when the weld is completed in two stages, metal being first deposited on one side of the article and then on the other. Under these conditions the incidental reheating of the metal first deposited during the welding of the second side seems to be the equivalent of the systematic heat-treatment to which chromium-molybdenum steel is usually subjected.

The rods of my invention may be used wherever a weld of unusual strength is required, and the parts welded may be chromium-molybdenum or other alloy steel or carbon steel. The presence in the welding rods of elements other than those specifically mentioned herein is not precluded, and at times may be desirable.

I claim:

1. A welding rod consisting predominantly of iron and containing chromium 0.25% to 1.50%, molybdenum 0.10% to 0.75%, carbon 0.10% to 0.50%, manganese 0.25% to 1.25%, and silicon 0.10% to 0.75%.

2. A welding rod consisting predominantly of iron, and containing other elements in about the following proportions: chromium, 0.75%; molybdenum, 0.20%; carbon, 0.20%; manganese, 1.00%, and silicon, 0.50%.

In testimony whereof I affix my signature.

FREDERICK M. BECKET.